United States Patent
Bayter et al.

(10) Patent No.: US 12,255,963 B2
(45) Date of Patent: Mar. 18, 2025

(54) METHOD OF MAINTAINING A COMPUTING PROCESS EXECUTABLE BY A NETWORKED COMPUTING DEVICE

(71) Applicant: Ormuco Inc., Montreal (CA)

(72) Inventors: Orlando Bayter, Montreal (CA); Genevieve Nantel, Montreal (CA)

(73) Assignee: Ormuco Inc., Montreal (CA)

( * ) Notice: Subject to any disclaimer, the term of this patent is extended or adjusted under 35 U.S.C. 154(b) by 0 days.

(21) Appl. No.: 18/543,382

(22) Filed: Dec. 18, 2023

(65) Prior Publication Data

US 2024/0129372 A1    Apr. 18, 2024

Related U.S. Application Data

(62) Division of application No. 17/766,239, filed as application No. PCT/CA2019/051414 on Oct. 2, 2019, now Pat. No. 12,021,935.

(51) Int. Cl.
*H04L 67/289* (2022.01)
*H04L 61/3015* (2022.01)
*H04L 67/148* (2022.01)

(52) U.S. Cl.
CPC ........ *H04L 67/289* (2013.01); *H04L 61/3025* (2013.01); *H04L 67/148* (2013.01)

(58) Field of Classification Search
None
See application file for complete search history.

(56) References Cited

U.S. PATENT DOCUMENTS 8,856,277 B2 * 10/2014 Saugnac ............... H04L 51/23
                                                      701/1
10,546,056 B1 * 1/2020 Cervelli ............... G06F 40/177
                              (Continued)

FOREIGN PATENT DOCUMENTS

| CA | 2929825 | 11/2018 |
|---|---|---|
| CN | 105430043 | 3/2016 |

(Continued)

OTHER PUBLICATIONS

Jie Lin et al., A Survey on Internet of Things: Architecture, Enabling Technologies, Security and Privacy, and Applications, IEEE Internet of Things Journal, vol. 4, No. 5, Oct. 2017, pp. 1125-1142.

*Primary Examiner* — Quang N Nguyen
(74) *Attorney, Agent, or Firm* — Nexus Law Group LLP; Nicholas P. Toth

(57) ABSTRACT

A system and method for maintaining a computing process executable by a computing device is provided. The method involves: (a) receiving by a maintenance device a status indication associated with the computing process; (b) determining one or more proposed actions associated with the status indication; (c) selecting a maintenance action from among the proposed actions; and (d) executing the maintenance action at the computing device. Determining the proposed actions may involve retrieving known actions from a known-action database of the maintenance device. Determining the proposed actions may involve querying respective databases of a plurality of the maintenance devices to retrieve shareable actions. Selecting the maintenance action may involve emulating each proposed action and the computing process to produce a confidence indication, and selecting the proposed action with the highest confidence.

10 Claims, 11 Drawing Sheets

(56) References Cited

U.S. PATENT DOCUMENTS

| | | | | |
|---|---|---|---|---|
| 11,017,321 | B1* | 5/2021 | Mishra | G05B 23/0283 |
| 11,954,427 | B2* | 4/2024 | Cervelli | G06F 40/177 |
| 2016/0337262 | A1 | 11/2016 | Bayter et al. | |
| 2018/0356151 | A1 | 12/2018 | Suraganda Narayana et al. | |

FOREIGN PATENT DOCUMENTS

| | | |
|---|---|---|
| CN | 108874525 | 11/2018 |
| CN | 109639833 | 4/2019 |

\* cited by examiner

METHOD OF MAINTAINING A COMPUTING PROCESS EXECUTABLE BY A NETWORKED COMPUTING DEVICE

BACKGROUND OF THE INVENTION

1. Field of Invention

This invention relates to networks of edge computing devices and, in particular, to method of maintaining a computing process executable by a computing device of a plurality of networked computing devices.

2. Description of Related Art

Canadian patent No. 2,929,825 to Bayter et al. and United States patent application publication No. 2016/0337262 to Bayter et al., both entitled METHOD OF AND SYSTEM FOR MANAGING A FEDERATION OF CLOUD COMPUTING RESOURCES, each disclose a cloud federation management system hosting an identity provider module that is operable to establish connections between user devices and cloud management systems that are associated with cloud computing resources. The cloud federation management system further hosts a collector module that is operable to monitor computing processes being executed by the cloud computing resources, respectively. The cloud federation management system is operable to generate cloud federation usage data indicative of a usage of the federation of cloud computing resources by the user.

The cloud federation management system of Bayter et al. results in a more efficient management of a federation of cloud computing resources while providing a desirable flexibility to the user. Such flexibility results from permitting the user to select one or more cloud computing resources from the federation of cloud computing resources on an as-needed/as-requested basis, while accurately monitoring the actual usage of the cloud computing resources.

In contrast to cloud computing, edge computing is a distributed computing paradigm which brings computer data storage and computational processing closer to the location where it is needed.

Previously, however, effective techniques for implementing edge computing were not fully developed.

An object of the invention is to address this shortcoming of edge computing.

SUMMARY

The above shortcomings may be addressed by providing, in accordance with one aspect of the invention, a method of maintaining a computing process executable by a computing device of a plurality of networked computing devices. The method involves: (a) receiving, from the computing device by a maintenance device of the plurality of networked computing devices, a status indication associated with the computing process; (b) determining by the maintenance device one or more proposed actions associated with the status indication; (c) selecting by the maintenance device a maintenance action from among the one or more proposed actions; and (d) executing the maintenance action at the computing device.

Step (a) may involve receiving the status indication selected from the group consisting of a system log and a performance metric. Step (a) may involve associating the status indication with a status type. Step (b) may involve retrieving, by the maintenance device from a known-action database of the maintenance device, zero or more known actions corresponding to the status indication, and selecting the one or more proposed actions to include the zero or more known actions. Step (b) may involve querying, by the maintenance device, respective databases of a plurality of the maintenance devices to retrieve zero or more shareable actions associated with the status indication, and selecting the one or more proposed actions to include the zero or more shareable actions. Step (b) may involve conducting by the maintenance device a web search to produce zero or more possible actions associated with the status indication, and selecting the one or more proposed actions to include the zero or more possible actions. Step (b) may involve generating by the maintenance device a web query associated with the status indication. Step (c) may involve, if the one or more proposed actions consist of one the known action, selecting the maintenance action to be the one known action. Step (c) may involve emulating, by the maintenance device, the computing process to produce an emulated status indication. Step (c) may involve emulating each the proposed action and the computing process to produce a confidence indication associated with each such proposed action, and selecting the maintenance action to be a highest-confidence action of the proposed actions. Step (d) may involve modifying the computing process by executing a patch-type program change at the computing device. Step (d) may involve modifying the computing process by use of an application program interface.

In accordance with another aspect of the invention, there is provided a method of maintaining a computing process executable by a computing device. The method involves: (a) receiving by a maintenance device a status indication associated with the computing process; (b) determining by the maintenance device one or more proposed actions associated with the status indication; (c) selecting by the maintenance device a maintenance action from among the one or more proposed actions; and (d) executing the maintenance action at the computing device.

Step (a) may involve receiving the status indication wherein the computing process has associated therewith a plurality of the status indications, at least one of the status indications indicating an error condition.

In accordance with another aspect of the invention, there is provided a system for processing a plurality of user requests of a user device by a plurality of networked computing devices, the system comprising: (a) receiving means for receiving a first user request of the plurality of user requests; (b) assessment means for determining whether the receiving means is optimally selected for processing the plurality of user requests; (c) selection means for selecting, if the receiving means is not optimally selected, optimal processing means having associated therewith an optimal response time; and (d) redirection means for directing subsequent requests of the plurality of user requests from the user device to the optimal processing means.

In accordance with another aspect of the invention, there is provided a system for maintaining a computing process executable by a computing device of a plurality of networked computing devices, the system comprising: (e) receiving means for receiving from the computing device a status indication associated with the computing process; (f) proposing means for determining one or more proposed actions associated with the status indication; (g) selection means for selecting a maintenance action from among the one or more proposed actions; and (h) maintaining means for executing the maintenance action at the computing device.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

A system for processing a plurality of user requests of a user device by a plurality of networked computing devices includes: (a) receiving means for receiving a first user request of the plurality of user requests; (b) means for determining whether said receiving means is optimally selected for processing the plurality of user requests; (c) means for selecting, if said receiving means is not optimally selected, optimal processing means having associated therewith an optimal response time; and (d) means for directing subsequent requests of the plurality of user requests from said user device to said optimal processing means.

Additionally or alternatively, the system or a separate system for maintaining a computing process executable by a computing device of a plurality of networked computing devices includes: (e) means for receiving from the computing device a status indication associated with the computing process; means for determining one or more proposed actions associated with said status indication; means for selecting a maintenance action from among said one or more proposed actions; and means for executing said maintenance action at the computing device.

Figure 1:
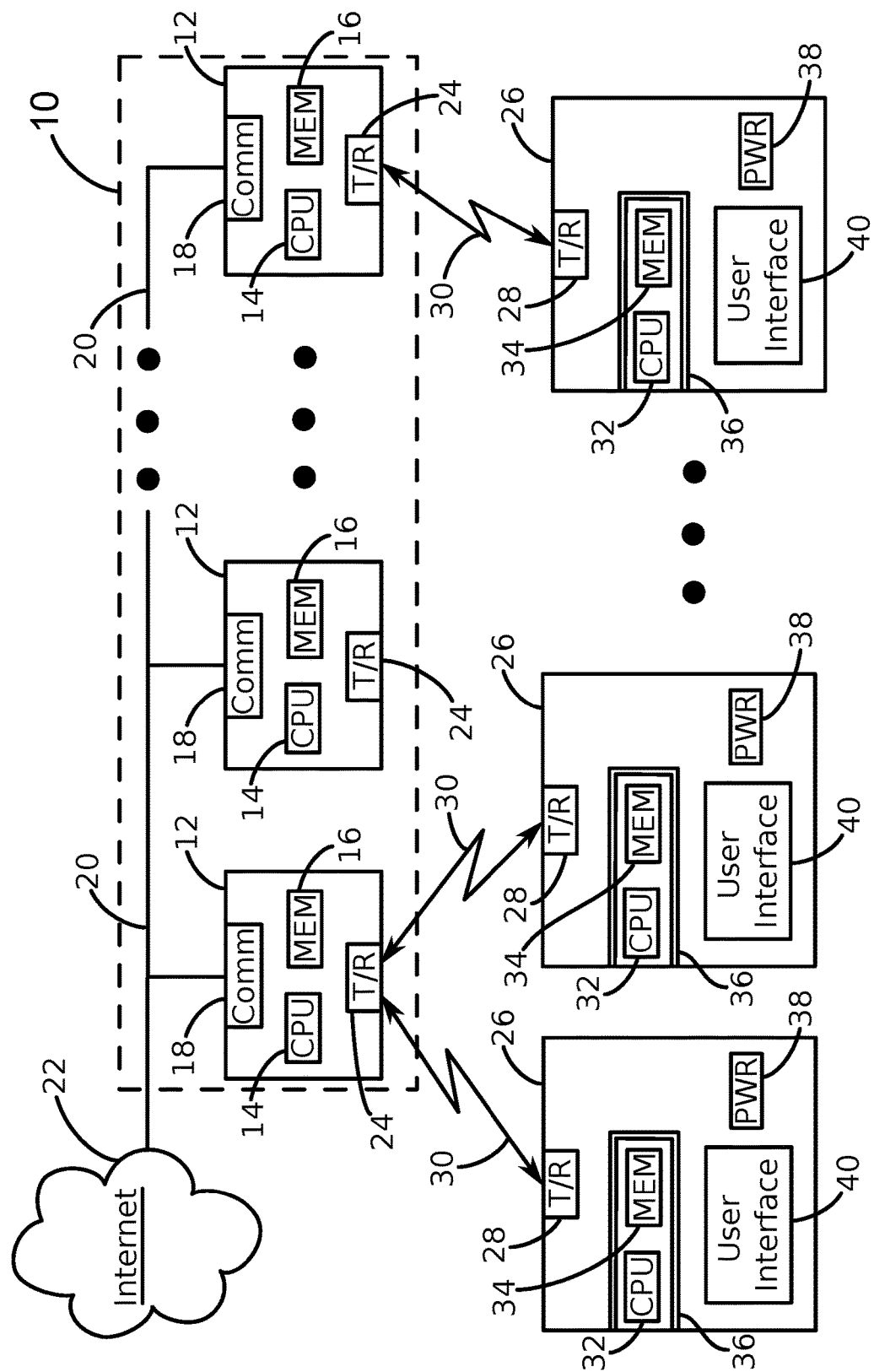
FIG. 1 is a block diagram of a system for processing a plurality of user requests of a user device by a plurality of networked computing devices according to a first embodiment of the invention.

Referring to FIG. 1, the system according to a first embodiment of the invention is shown generally at 10. The system 10 includes a plurality of networked computing devices 12.

Each networked computing device 12 is typically configured as a server computer, and in general may be any computing device such as all or part of a microcomputer, mobile device, desktop computer, minicomputer, communication gateway, communication tower controller, mini-tower controller, mainframe computer, data centre, or any combination thereof for example. In variations, multiple numbers of networked computing devices 12 may form a single data centre accessible by other networked computing devices 12.

Each networked computing device 12 includes a processing circuit, such as the CPU (Central Processing Unit) 14 shown in FIG. 1; and a memory circuit, such as the memory unit 16 shown in FIG. 1.

In various embodiments, the CPU 14 may be implemented as one or more circuit units, digital signal processor, embedded processor, etc., and any combination thereof operating independently or in parallel, including possibly operating redundantly. The CPU 14 may include circuitry for storing memory, such as digital data, and may comprise the memory unit 16 or be in wired or wireless communication with the memory unit 16, for example.

The memory unit 16 is operable to store digital representations of data or other information, such as status indications, measurement results, control information, program code for directing operations of the CPU 14, or any combination thereof for example. The memory unit 16 may be operable to store digital representations as volatile memory, non-volatile memory, dynamic memory, etc. or any combination thereof for example. In variations of embodiments, some or all of the memory units 16 include or constitute a database for storing data and relationships between data.

Each networked computing device 12 also includes a communications module 18 for effecting networked communications with other networked computing devices 12 via the communications link 20 shown in FIG. 1. In the first embodiment shown in FIG. 1, the networked computing devices 12 are operable to communicate via the Internet 22, including accessing and providing cloud-based services. In general, the networked computing devices 12 are operable to communicate with each other via the Internet 22.

While the communication link 20 is shown in FIG. 1 as wired connections, in general any wired or wireless connection may be employed, including a copper wire link, a coaxial cable link, a fiber-optic transmission link, a radio link, a cellular telephone link, a satellite link, a line-of-sight free optical link, and any combination thereof, for example. As part of or separately from the communications module 18, each networked computing device 12 of the first embodiment is operable to effect wireless communications via a wireless communications module 24.

In the first embodiment, the networked computing devices 12 are operable to process user requests generated by one or more user devices 26. A user request can be any request for a computing service task, including requests for streaming of data (e.g. streaming audio, video or computer game data), requests to retrieve and display a web page (e.g. selected by invoking a hyperlink), requests to process data (e.g. data analysis), requests for provisioning a virtual machine, requests for software as a service (SaaS), requests for platform as a service (PaaS), requests for infrastructure as a service (IaaS), other computing service tasks, or any combination thereof.

In the first embodiment, the user device 26 can be any communications device operable to send and receive communications, including telephone communications via a telephone network (not shown), data communications such as machine-to-machine communications, other wireless or wired communications, and any combination thereof for example.

The user device 26 typically is or includes a mobile telephone having a wireless communications module 28, but in variations may be any general purpose computer device, desktop computer, laptop computer, notebook computer, tablet computer, Internet-of-Things (IoT) device, personal communication device, two-way radio, personal digital assistant, wearable technology device, automobile or other transportation vehicle (e.g. having installed therein communications equipment), similar computational device, or any combination thereof for example.

Communications between the system 10 and the user devices 26 may be conducted directly, such as via the direct wireless link 30 shown in FIG. 1, or indirectly, such as via a telecommunications network, LAN (local-area network), WAN (wide-area network), and/or a global communications network like the Internet 22 shown in FIG. 1.

In the first embodiment, the networked computing devices 12 are configured for use within a 5G (certification mark) cellular network environment in which some or all of the networked computing devices 12 are 5G base stations and some or all of the user devices 26 are 5G-compatible mobile communications devices. In the first embodiment, the plurality of networked computing devices 12 typically provide Internet 22 access and telecommunications services to the user devices 26.

In some embodiments, the system 10 and the user devices 26 communicate with each other via the direct wireless link 30 by near-field wireless communications (e.g. Bluetooth (™) standard communications, NFC (Near-Field Communications) standard communications, etc.). In variations, the system 10 and the user devices 26 are operable to communicate with each other via the Internet 22, and/or via an indirect link such as may be implemented using any suitable wired or wireless telephonic or other communications technology, for example.

Each user device 26 includes a processing circuit, such as the CPU (Central Processing Unit) 32 shown in FIG. 1; and a memory circuit, such as the memory unit 34 shown in FIG. 1.

In various embodiments, the CPU 32 of the user device 26 may be implemented as one or more circuit units, digital signal processor, embedded processor, etc., and any combination thereof operating independently or in parallel, including possibly operating redundantly. The CPU 32 may include circuitry for storing memory, such as digital data, and may comprise the memory unit 34 or be in wired or wireless communication with the memory unit 34, for example. The memory unit 34 of the user device 26 is operable to store digital representations of data or other information, such as status indications, measurement results, control information, program code for directing operations of the CPU 32, or any combination thereof for example. The memory unit 34 may be operable to store digital representations as volatile memory, non-volatile memory, dynamic memory, etc. or any combination thereof for example.

In the first embodiment, the CPU 32 and the memory unit 34 are removably detachable from the remainder of the user device 26. However, in some embodiments, the CPU 32 and the memory unit 34 are integral to the user device 26.

In embodiments of the user device 26 having a removably attachable processor card 36 containing the CPU 32 and the memory unit 34, the processor card 36 is powered by an electrical power source 38, which typically includes one or more batteries in the case of a mobile user device 26. Electrical power conditioning, if any, may be performed by the processor card 36, the electrical power source 38, or any combination thereof for example.

In the first embodiment, the processor card 36 is operable to control the operations of the wireless communications module 28. In some embodiments, the wireless communications module 28 of the user device 26 includes a wireless antenna and all processing of wireless signals is performed by the processor card 36. In general, any combination of the wireless communications module 28 and the processor card 36 may be employed to transmit, receive, and process communications of the user device 26.

In the first embodiment, the processor card 36 is operable to control the operations of a user interface 40. In general, the user interface 40 may be operable to accept any suitable form of user input, such as accepting physical keyboard input, soft keyboard input, touchscreen input, keypad input, freehand graphic input, mouse movement, trackball movement, trackpad pressure movement, tactile input, joystick control input, data glove input, voice commands, gesture or other visual commands, other forms of user input, and any combination thereof for example. Similarly, the user interface 40 may be operable to produce any suitable form of user output, such as visual display, holographic display, audio or other forms of sound, bone conduction audio, haptic feedback, kinesthetic communication, smell, other forms of user output, and any combination thereof for example.

Figure 2:
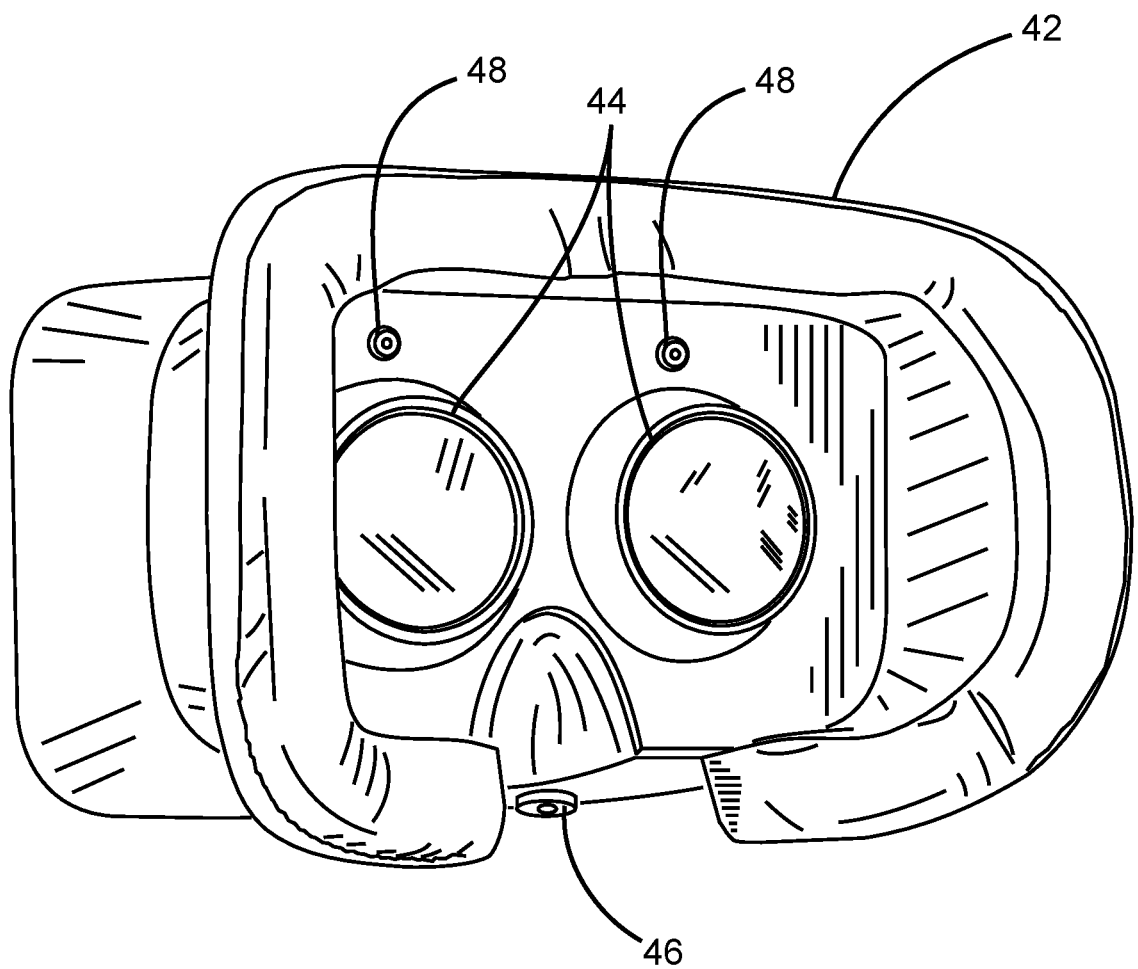
FIG. 2 is a perspective view of the user device shown in FIG. 1, showing a headset having a hand-motion sensor.

Referring to FIG. 2, the user device 26 in the first embodiment is operable to create a virtuality interface, such as a virtual-reality (VR) interface, augmented-reality (AR) interface, or any combination thereof. In the first embodiment, the virtuality interface is created by the user interface 40. In variations, such virtuality interface may be implemented via a head-mounted display, VR headset, VR goggles, AR goggles, AR glasses, or the like.

The user device 26 in some embodiments is the VR goggles 42 shown in FIG. 2. In the embodiment of FIG. 2, the VR goggles 42 include a pair of lenses 44 for producing respective images that give a user wearing the VR goggles 42 the illusion of depth by stereoscopy.

In the exemplary embodiment of FIG. 2, the VR goggles 42 are operable to detect the head position of the user. In variations of embodiments, the VR goggles 42 may include a gyroscope, accelerometer, magnetometer, other sensor, or any combination thereof to detect the relative position of the VR goggles 42 and hence the user's head position.

The VR goggles 42 are also operable in the embodiment of FIG. 2 to scroll the appearance of the stereoscopic images in response to the user's head position, such as in response to the sensed position of the VR goggles 42. In this manner, a user can rotate their head to view portions of a panoramic VR display being presented to the user by the VR goggles 42.

The VR goggles 42 in some embodiments include one or more sensors, which may be infrared sensors, motion sensors, other sensors, and/or the camera 46 shown in FIG. 2, for capturing hand motion of the user, including in some embodiments capturing finger motion. By way of example in a business context, the VR goggles 42 are operable to display several word-processing documents relative to different head positions; sense the user's head position to determine which document is actively being considered by the user; capture and visually process hand motion as user input; and manipulate the documents in response to hand motion. A user may sweep a hand across an area in front of the user's body to indicate moving and/or closing of a document; bring two hands and/or fingers closer together or farther apart to indicate a change in a zoom setting associated with the display of an active document; move the fingers in a typing style to cause text to be typed into an active document; move a hand and/or finger in a suitable direction to cause the pressing of a VR button; perform other hand motions as user input; or any combination thereof for example.

By way of further use-case examples, the VR goggles 42 are operable to display one or more Web pages of a website accessible via the Internet 22; and to receive user input to select hyperlink(s) and URLs (Uniform Resource Locator) for example. Other use-cases and variations thereof are possible.

In general, any suitable techniques and sensing technology may be employed to detect hand motion as user input.

The VR goggles 42 in some embodiments include sensors, such as the eye-position sensors 48 shown in FIG. 2, for detecting an eye position of the user. For example, the sensors 48 are operable in some embodiments to detect the position of each eye of the user. In some embodiments, an eye position of one eye only is detected and both eyes are assumed to have the same directional position. Conversely, the separate eye positions of each eye can be detected and an average eye position calculated as the mid-position between the two separately detected eye positions. Eye position of the user may be employed to advantageously assist the displaying of the stereoscopic images, such as by scrolling in response to the direction in which the user is looking.

Additionally or alternatively, eye position may be employed as a form of user input, such as where looking at a VR-displayed icon invokes software features associated with that icon. The system 10 may be operable to permit a user to use deliberate eye blinking as a form of user input. The eye-position sensors 48 may be infrared sensors or other sensors of any suitable technology for detecting eye position. The VR goggles 42 in some embodiments also includes a microphone (not shown) to receive audio user input, such as voice commands.

Method of Processing User Requests

Referring to FIGS. 1 to 4, the memory unit 16 of each networked computing device 12 in accordance with the first embodiment of the invention contains blocks of code comprising computer executable instructions for directing the CPU 14 to perform computing processes as described herein. Additionally or alternatively, such blocks of code may form part of a computer program product comprising computer executable instructions embodied in a signal bearing medium, which may be a recordable computer readable medium or a signal transmission type medium, for example.

Different memory units 16 of different networked computing devices 12 may contain different blocks of code at different times. Typically, some core blocks of code are stored in each and every networked computing device 12. Various computing operations may be redundantly processed at different networked computing devices 12. In some embodiments, one or a small number of networked computing devices 12 are designated as management device(s) 12 for performing certain computing operations associated with the entire plurality of networked computing devices 12. Where stated herein that a given block of code is executed at a given networked computing device 12, it is understood that in general each and every networked computing device 12 is operable to execute such block of code but that advantageous efficiencies can in some circumstances be obtained by selecting particular networked computing devices 12 to execute certain blocks of code in such circumstances as described in more detail herein below.

Figure 3:
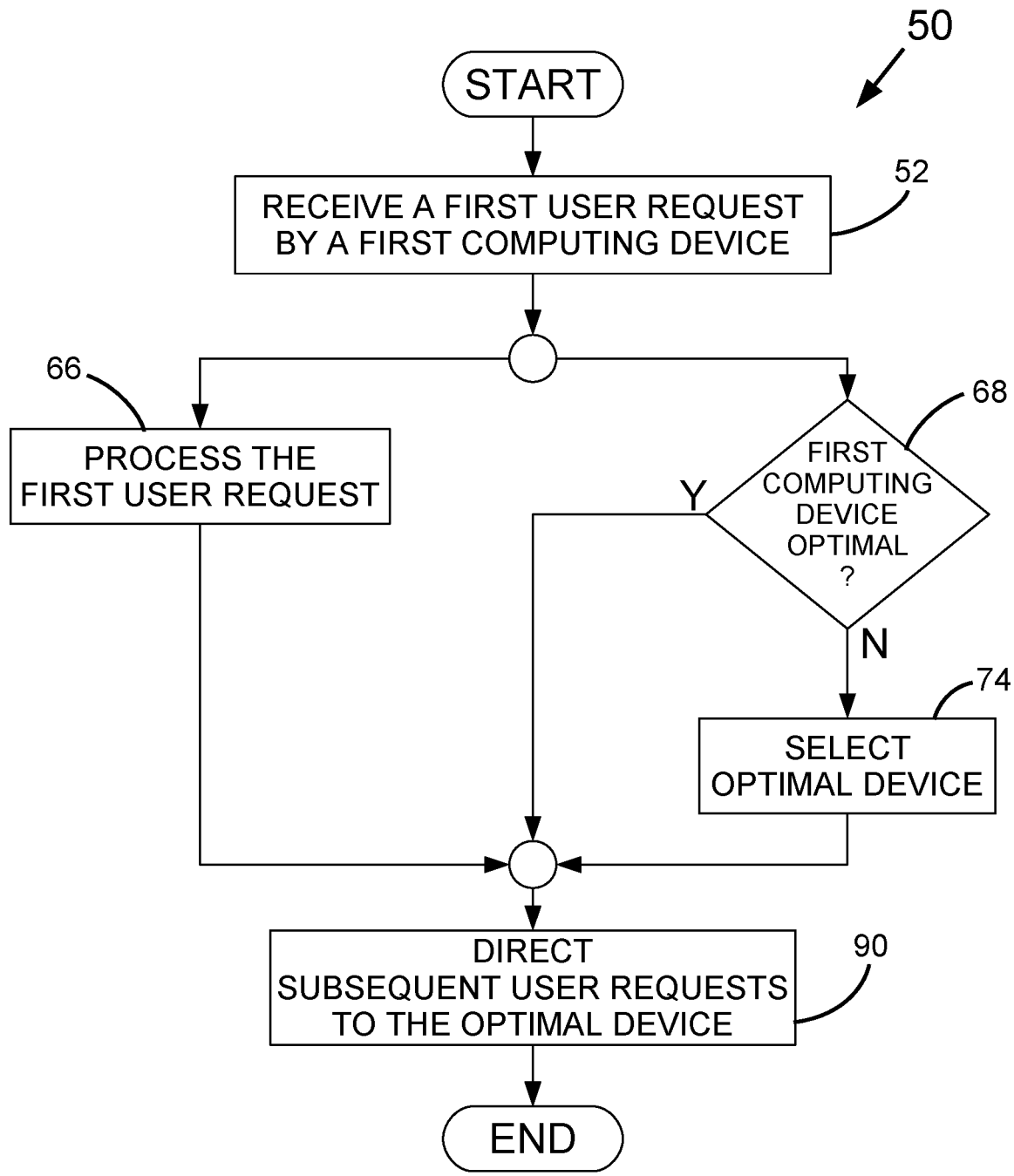
FIG. 3 is a flow diagram of a method of processing the plurality of user requests by the system shown in FIG. 1, showing the step of selecting an optimal device.

Referring to FIG. 3, when electrical power is being supplied to the CPU 14 and the memory unit 16 of a first computing device 12 of the plurality of networked computing devices 12, the CPU 14 is directed to perform the steps of a method shown generally at 50. The method 50 begins by the CPU 14 executing the instructions of block 52 shown in FIG. 3. Block 52 directs the CPU 14 to receive a first user request.

When the user device 26 is generating its user request, the user device 26 is located at some current geographical location, which may change from time to time, such as in the case of a pedestrian walking while using their mobile device or a communications-equipped automobile for example. In the first embodiment, the networked computing devices 12 are each located at fixed geographical locations, respectively. However, in general, the locations of the networked computing devices 12 need not always be fixed. For example, the plurality of networked computing devices 12 may include telecommunications base stations, data centres, or other processing devices that are typically moved rarely if ever. The geographical separation between the user device 26 and the plurality of networked computing devices 12 result in communications network latency or time delays associated with the communications between the user device 26 and various networked computing devices 12.

Figure 4:
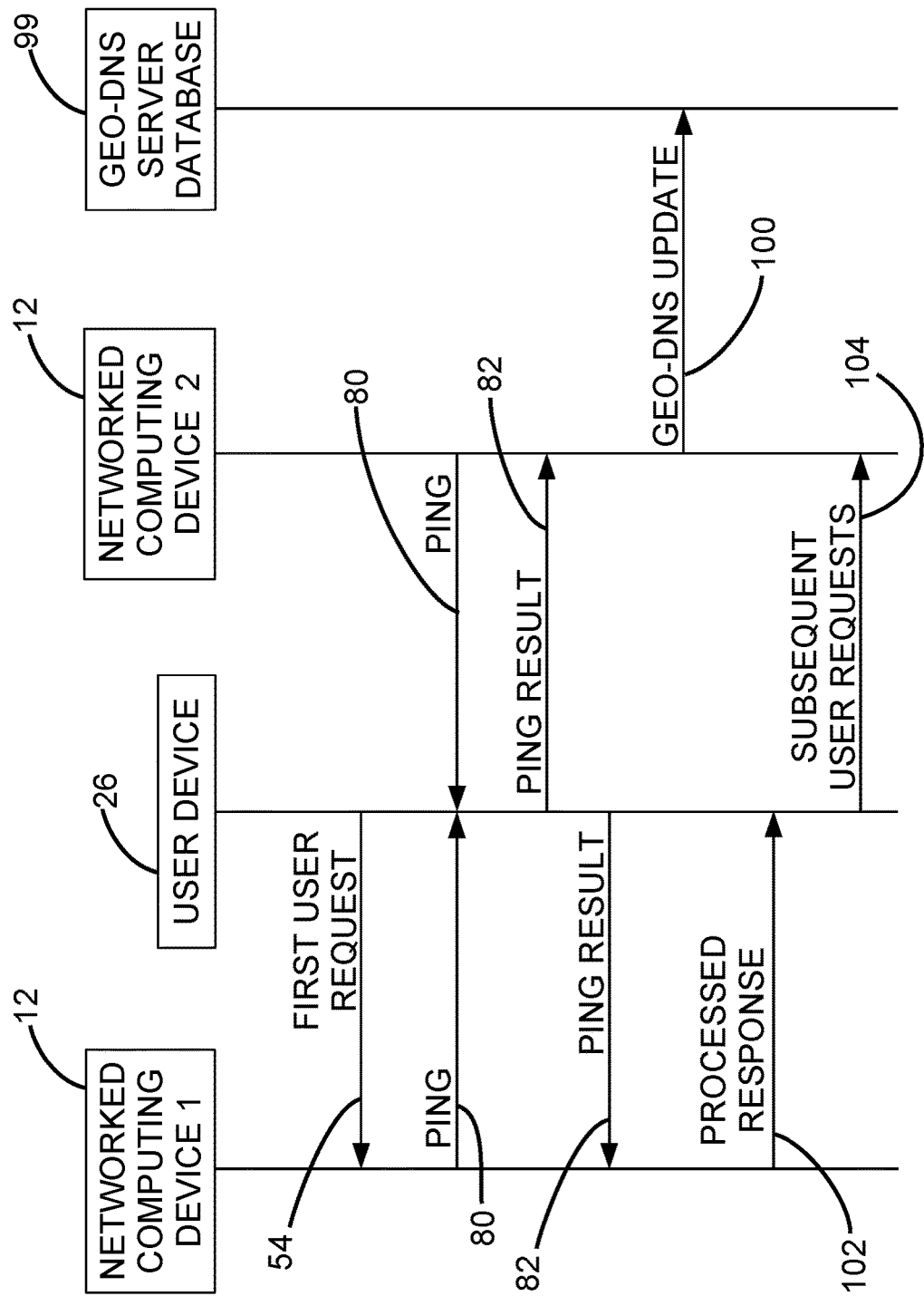
FIG. 4 is timeline chart showing tasks performed to process the plurality of user requests according to the method shown in FIG. 3, showing a geo-DNS update.

Referring to FIG. 4, the user device 26 generates its user request 54 at some time and it is transmitted to the first computing device 12. The first computing device 12 may be initially selected from among the plurality of networked computing devices 12 by default settings associated with the user device 26, for example, resulting in a measurable latency of communications between the user device 26 and the first computing device 12.

Figure 5:
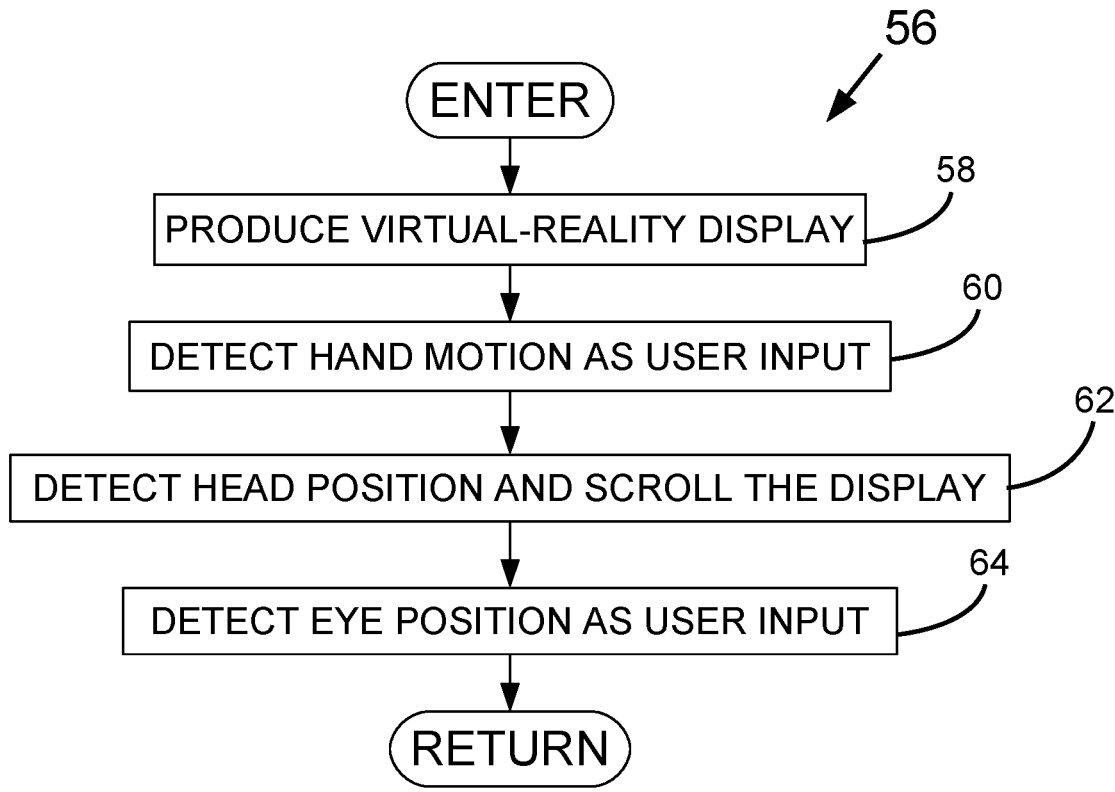
FIG. 5 is a flow diagram of a method of operation of the headset shown in FIG. 2, showing the step of detecting hand motion as user input.

Referring to FIG. 5, in the case of a VR user device 26 an exemplary method for directing the CPU 32 of the user device 26 to generate its user request 54 (FIG. 4) is shown generally at 56. Method 56 begins execution at block 58, which directs the CPU 32 (FIG. 1) to produce a VR display at the pair of lenses 44 (FIG. 2).

Block 60 then directs the CPU 32 to detect hand motion of the user as user input. The user input detected may result in a requirement for the system 10 to perform a computer-based task (e.g. open, close, save, delete a document or Web page, etc.) within the context of computing services being provided to the user of the user device 26. In variations, the method 56 may also include executing block 62, which directs the CPU 32 to detect the user's head position and scroll the VR display accordingly. In further variations, the method 56 may include executing block 64, which directs the CPU 32 to detect as user input the eye position of the user's eye(s).

While FIG. 5 shows the exemplary blocks 58 to 64 in a particular order, in general one or more of blocks 58 to 64 may be executed in any order and in any relation to each other. Different blocks in different orders may be executed at different times as circumstances vary for example.

Upon receiving the appropriate user input, the CPU 32 creates the user request 54 (FIG. 4) for processing by the system 10 (FIG. 1) and transmits the user request 54 to the first computing device 12.

Referring back to FIG. 3, after block 52 has been executed, the CPU 14 of the first computing device 12 is then directed to execute block 66. In the first embodiment, block 66 directs the CPU 14 to begin processing the first user request 54. The processing of the first user request 54 may be performed by any suitable computational method, such as by techniques known to those skilled in the art.

Simultaneously or otherwise in parallel, block 68 directs the CPU 14 to determine whether the first computing device 12 is optimally selected among the plurality of networked computing devices 12 for processing user requests received from the user device 26. In general, any CPU 14 of any networked computing device 12 may be employed to determine whether the first computing device 12 is optimally selected such that it is, in general, the plurality of networked computing devices 12 that is operable to execute block 68. For ease of description it is taken herein that the first computing device 12 is operable to process the first user request 54 and also to determine whether it is optimally selected, as the specific identity of the first computing device 12 among the plurality of networked computing devices 12 is arbitrary for the purposes of the detailed description herein.

Figure 6:
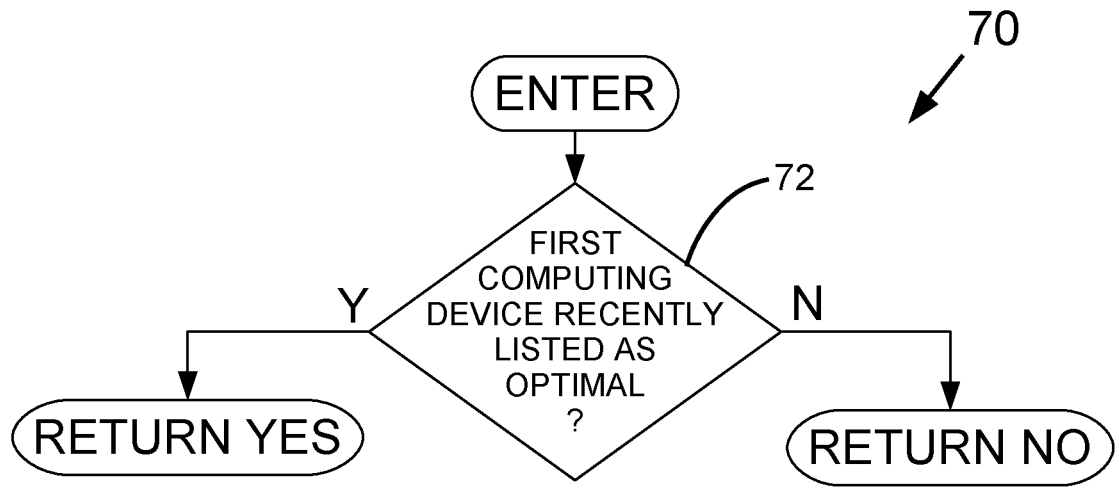
FIG. 6 is a flow diagram of a method of performing the step of determining whether the first computing device is optimal according to the method shown in FIG. 3, showing the step of determining whether the first computing device has been recently listed as optimal.

Referring to FIG. 6, an exemplary method for directing the CPU 14 to perform steps of block 68 (FIG. 3) is shown generally at 70. Method 70 begins execution at block 72, which directs the CPU 14 to determine whether the first computing device 12 is recently listed as being optimally selected. In the first embodiment, the plurality of networked computing devices 12, or any subset thereof, determines whether the first computing device 12 has been optimally selected within a preceding pre-determined period of time.

In the first embodiment, the first computing device 12, or in some embodiments each group of networked computing devices 12 forming a data centre, maintains a cached index of IP (Internet Protocol) address ranges indicating the optimal device 12 from among the plurality of networked computing devices 12 for a given user device 26 identifiable by its IP address. For each listed user device 26, the association to an optimally selected networked computing device 12 expires after a period of time, which amount of time may be varied according to network operation parameters such as network configuration or dynamically in response to network congestion for example. By way of further example, different expiry times may be used for different computing application services made available to user devices 26. Additionally or alternatively, expiry times may vary depending on parameters of service level agreements associated with each different user device 26. Specifying an expiry time advantageously accommodates a balanced trade-off between network overhead and responsiveness to changes in the user device 26 location.

If the optimal network computing device 12 for a given user device 26 is listed, has not expired, and indicates that the first computing device 12 is optimally selected for that user device 26, then method 70 returns an indication of "yes". Otherwise, the method 70 returns an indication of "no".

Referring back to FIG. 3, if at block 68 it is determined that the first computing device 12 is not already known to be optimally selected, then block 74 directs the CPU 14 to select an optimal device from among the plurality of networked computing devices 12. In the first embodiment, the plurality of networked computing devices 12 select an optimal device having associated therewith an optimal response time.

Figure 7:
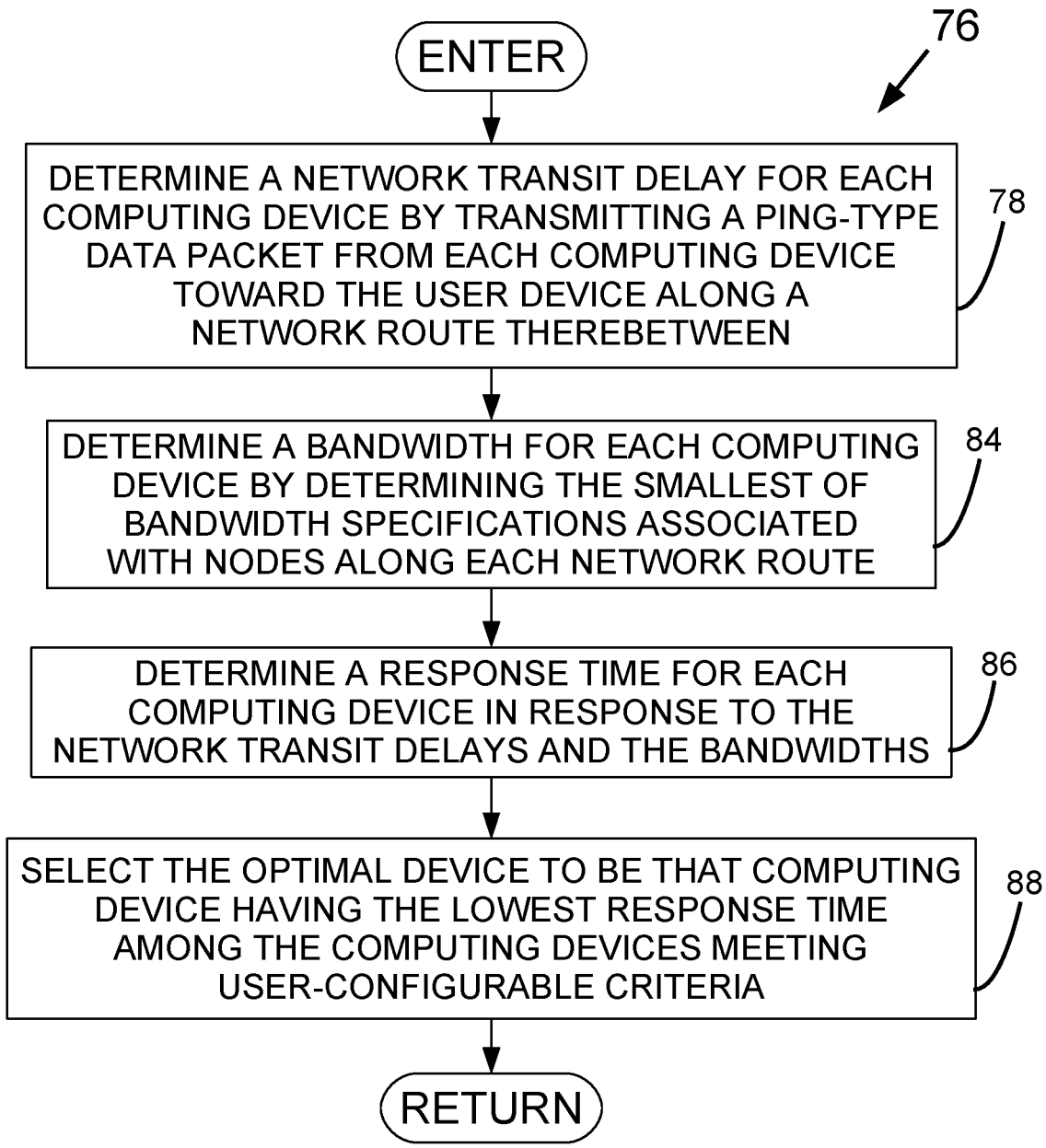
FIG. 7 is a flow diagram of a method of performing the step of selecting an optimal device according to the method shown in FIG. 3, showing the step of determining a response time for each computing device in response to network transit delays and bandwidths.

Referring to FIG. 7, an exemplary method for directing the CPU 14 to perform steps of block 74 (FIG. 3) is shown generally at 76. The method 76 begins execution at block 78, which directs the CPU 14 to determine a plurality of network transit delays associated with the user device 26 and the plurality of networked computing devices 12, respectively. In the first embodiment, doing so involves, for each network transit delay associated with the user device 26 and each networked computing device 12, transmitting a ping-type data packet from each networked computing device 12 toward the user device 26 along a network route therebetween. A data packet known in the art as a MTR (My TraceRoute) packet may be employed, for example.

In FIG. 4, two exemplary networked computing devices 12 are shown transmitting ping-type data packets 80 toward the user device 26. In general, each networked computing device 12 is located at a different geographical distance from the user device 26 and, due to network routing, there may be a different number of network hops involving different numbers of intermediate routing nodes between each different networked computing device 12 and the user device 26. Furthermore, network congestion and other factors will affect the time it takes for each ping-type data packet to travel as close as it can to the user device 26 and then return to its originating networked computing device 12 with an indication of the network transit delay, or ping result, 82.

By way of example, the networked computing device 12 that received the first user request 54 received its ping result 82 after the other illustrated networked computing device 12 received its ping result 82, indicating that the network transit delay 82 is lower for the other (second) networked computing device 12.

In the first embodiment, multiple ping-type data packets are sent by each networked computing device 12 and an average network transit delay is calculated for each networked computing device 12. In some embodiments, where there are groups of networked computing devices 12 forming a single data centre, only one network transit delay associated with one such networked computing device 12 is considered representative of the network transit delay associated with that data centre.

Referring back to FIG. 7, after block 78 has been executed, block 84 directs the CPU 14 to determine a plurality of bandwidths associated with the user device 26 and the plurality of networked computing devices 12, respectively. In the first embodiment, doing so involves, for each bandwidth associated with the user device 26 and each networked computing device 12, determining the smallest of a plurality of bandwidth specifications associated with one or more network routing nodes defining each network route.

Each node along the network route between each networked computing device 12 and the user device 26 has associated with it a bandwidth specification indicating the amount of data that can be transmitted by that node to the next node along the network route. For any given network route, the node having the smallest bandwidth specification is considered the bottleneck for that network route such that the smallest bandwidth specification is taken as the bandwidth of that entire network route. In this manner according to the first embodiment, the bandwidth associated with each networked computing device 12, relative to a given user device 26 and its current geographical location, is determined.

After block 84 has been executed, block 86 directs the CPU 14 to determine a plurality of response times associated with the first user request 54 (FIG. 4) and the plurality of networked computing devices 12 in response to the plurality of network transit delays 82 and the plurality of bandwidths, respectively. In the first embodiment, doing so involves determining a response time for each networked computing device 12 in relation to the given user device 26 at its current geographical location.

In the first embodiment, the response time for a given networked computing device 12 and a given user device 26 issuing a given user request 54 is calculated by the formula:

$$\text{Response Time} = \frac{\text{Network Transit Delay}}{x} \cdot \frac{\text{Bandwidth for User Request}}{\text{Bandwidth of Network Route}}$$

where Network Transit Delay is the value determined by block 78 of FIG. 7, Bandwidth for User Request is an indication of the amount of data being requested by the given user request, and Bandwidth of Network Route is the value determined by block 84 of FIG. 7.

Executing block 86 involves calculating the response times for all the networked computing devices 12 available to process user requests 54 (FIG. 4) of the given user device 26 (FIG. 1).

After block 86 has been executed, block 88 directs the CPU 14 to select the optimal device to be that networked computing device 12 having a lowest of the response times among a subset of the networked computing devices 12 meeting one or more user-configurable criteria. Such user-configurable criteria may include cost to the user for subscribing to computing services offered at the different networked computing devices 12 (e.g. only those networked computing devices 12 offering services at a user-acceptable price); redundancy requirements to have user requests 54 of the given user device 26 processed by multiple networked computing devices 12 (e.g. in parallel); privacy considerations (e.g. only those networked computing devices 12 in compliance with certain privacy regimes); other considerations, or any combination thereof for example. The user-configurable criteria may form part of a service level agreement with computing services providers, for example.

After block 88 has been executed, the process returns to the method 50 at block 74 (FIG. 3).

Referring back to FIG. 3, after block 74 has been executed, the CPU 14 is then directed to execute block 90 described herein below.

Also, if at block 68 it is determined that the first computing device is already known to be optimally selected, then the CPU 14 is directed to execute block 90.

In the first embodiment, block 90 is executed to direct subsequent user requests to the optimal device, which may be the first computing device 12 previously determined by block 68 to be already known to be optimally selected for the given user device 26, another networked computing device 12 selected by executing block 88 of method 76 (FIG. 7), or even the first computing device 12 confirmed as optimally selected by executing block 88 (FIG. 7).

Figure 8:
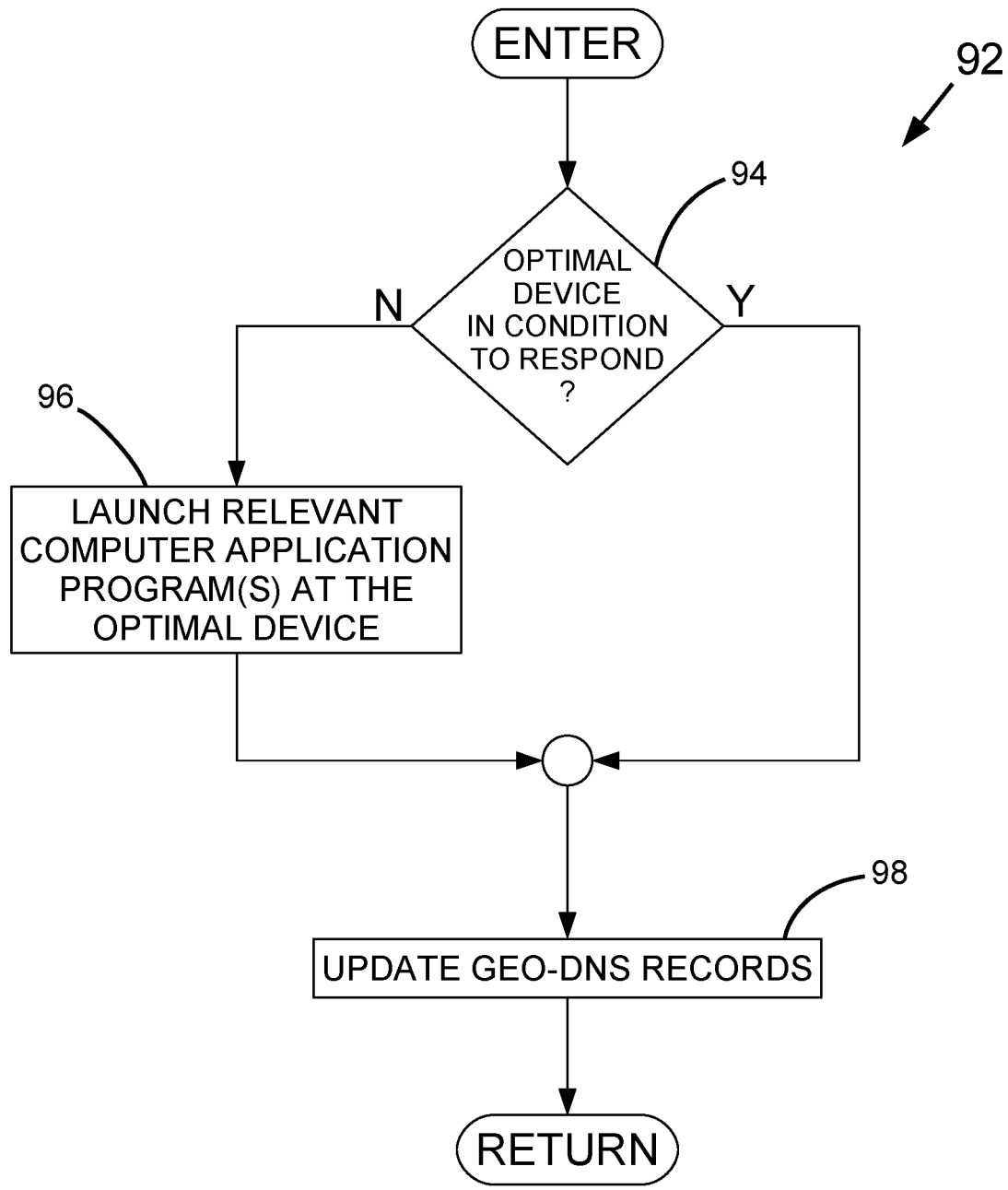
FIG. 8 is a flow diagram of a method of performing the step of directing subsequent user requests to the optimal device according to the method shown in FIG. 3, showing the step of updating geo-DNS records.

If the optimal device is different from the first computing device 12 that received the first user request 54, then the process is directed to method 92 shown in FIG. 8.

Referring to FIG. 8, method 92 begins execution at block 94, which directs the CPU 14 of the optimally selected networked computing device 12 or another networked computing device 12 to determine whether the optimal device 12 is in condition to respond to subsequent user requests from the given user device 26. In the first embodiment, if the computer program application(s) required to respond to the first user request 54 (FIG. 4) is not currently being executed at the optimal device 12, then the optimal device 12 is not considered in condition to respond to subsequent user requests from the same user device 26.

If by block 94, it is determined that the optimal device 12 is not in condition to respond to the first user request 54, then block 96 directs the CPU 14 of the optimal device 12 to launch such computer program application(s) at the optimal device 12, thereby rendering the optimal device 12 in condition to respond to subsequent user requests from the same user device 26.

After executing block 96, the process is directed to block 98 described herein below.

Also, if it is determined by block 94 that the optimal device 12 is in condition to respond to the first user request 54, then the process is directed to block 98.

Block 98 directs the CPU 14 to update a geographical domain name server database 99 (FIG. 4) associated with the plurality of networked computing devices 12. Such database may be implemented at a designated database computer 12 of the plurality of networked computing devices 12, at one or more management devices 12 of the plurality of networked computing devices 12, or may be distributed, redundantly or otherwise, among many or all of the networked computing devices 12.

In the first embodiment, updating the geographical domain name server database 99 in respect of the given user device 26 directs subsequent user requests from the user device 26 to the optimally selected networked computing device 12. In the first embodiment, updating the geographical domain server database 99 includes updating the geographical domain name server database 99 in respect of all IP addresses of the IP address range associated with the given user device 26. Also in the first embodiment, updating the geographical domain name server database 99 includes updating the contents of an associated zone file (not shown).

Referring back to FIG. 4, a geo-DNS update 100 occurs after the ping results 82 are returned and a new optimal device 12 has been selected. In the exemplary timeline of FIG. 4, the first computing device 12 returns a processed response 102 to the user device. While FIG. 4 shows the processed response 102 being returned after the geo-DNS update 100 occurs, in general, responding to the first user request 54 and processing the geo-DNS update 100 occur in parallel and may occur with any timing relationship to each other.

In the exemplary scenario of FIG. 4, the optimal device 12 was determined to have changed from the first computing device 12 to the other networked computing device 12, and subsequent user requests 104 are directed to the newly selected optimal device 12 as shown in FIG. 4.

In the first embodiment, the memory cache at the newly selected optimal device 12 or associated data centre is also updated so that the newly selected optimal device 12 will remain known to be the optimal device 12 for the subsequent user requests 104 for a certain pre-determined period of time.

Referring back to FIG. 8, after block 98 has been executed, the process returns to the method 50 at block 90 (FIG. 3).

Referring back to FIG. 3, after block 90 has been executed the method 50 ends. In general, the process of responding to user requests is ongoing for as long as electrical power is being supplied to the relevant devices of the system 10.

Thus, there is provided a method of processing a plurality of user requests of a user device by a plurality of networked computing devices, the method comprising: (a) receiving a first user request of the plurality of user requests by a first computing device of the plurality of networked computing devices; (b) determining by the plurality of networked computing devices whether said first computing device is optimally selected among the plurality of networked computing devices for processing the plurality of user requests; (c) if the first computing device is not optimally selected, then selecting by the plurality of networked computing devices an optimal device having associated therewith an optimal response time from among the plurality of networked computing devices; and (d) directing subsequent requests of the plurality of user requests from said user device to said optimal device.

Maintenance System

Figure 9:
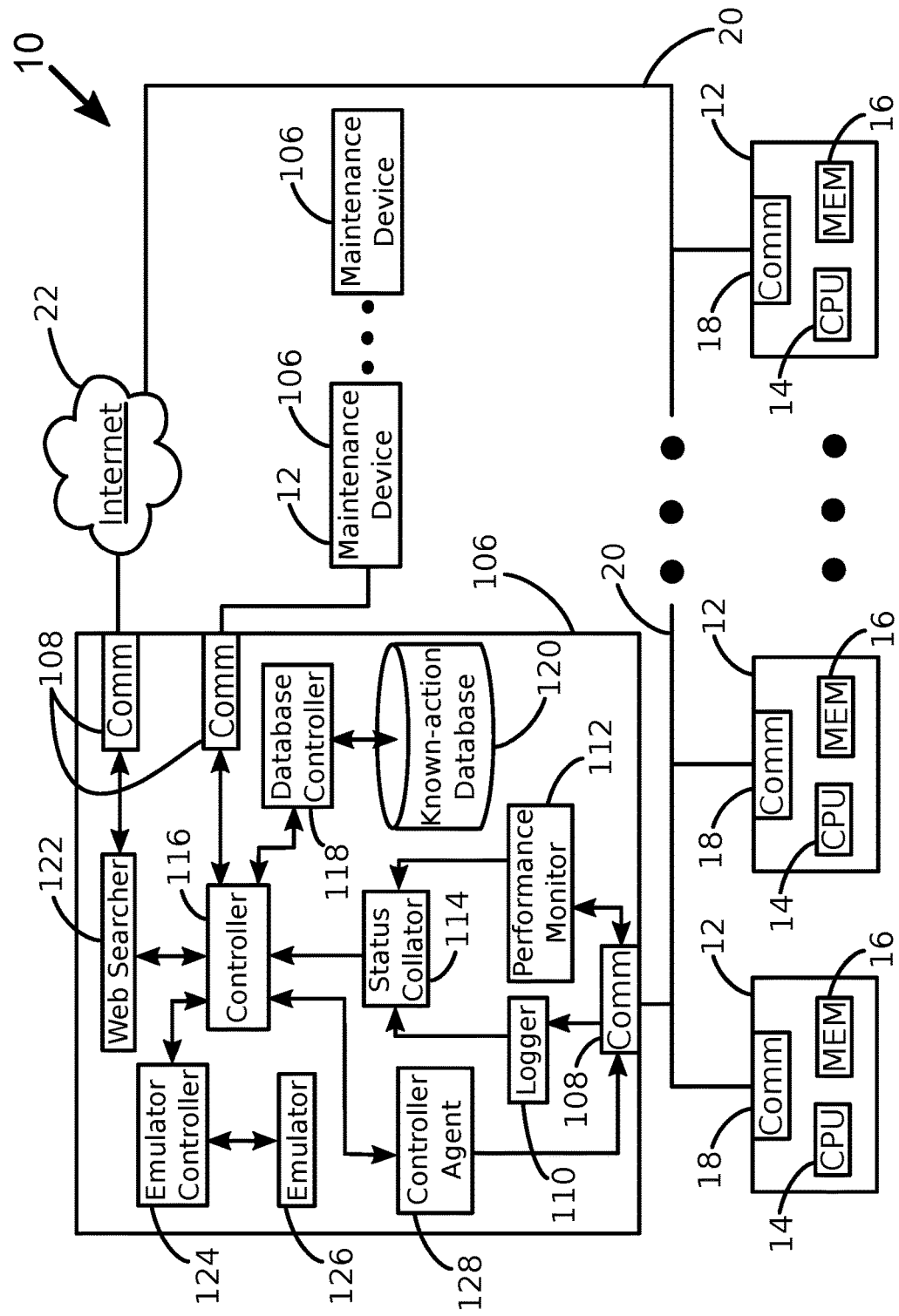
FIG. 9 is a block diagram of a system for maintaining a computing process executable by a computing device of a plurality of networked computing devices according to a second embodiment of the invention.

Referring to FIG. 9, the system 10 according to a second embodiment of the invention includes the plurality of networked computing devices 12, one or more of which are designated as maintenance devices 106 of the plurality of networked computing devices 12. The maintenance device(s) 106 are operable to maintain computing processes executable by the plurality of networked computing devices 12.

In some embodiments, the system shown in FIG. 9 is separate from the system 10 of FIGS. 1 to 8. In general, the teachings herein can be applicable to maintaining any computing process executable by any computing device. For ease of description, however, the system 10 according to the second embodiment includes the networked computing devices 12, which may be configured for use as 5G base stations operable to provide Internet 22 access and telecommunications services to user devices 26 (not shown in FIG. 9), and the maintenance devices 106 are designated as or form part of management devices 12, typically physically located at one or more major data centre(s), for performing maintenance operations associated with the entire plurality of networked computing devices 12. In some embodiments, computing processes executed at the user devices 26 (not shown in FIG. 9) are also maintained by the system 10.

In FIG. 9, functional modules of one maintenance device 106 is shown in detail. It is understood that the maintenance functions described and illustrated herein apply to all of the one or more maintenance devices 106. In some embodiments, many or all of the networked computing devices 12 are operable to perform maintenance functions on or for each other.

The maintenance device 106 includes a communications module 108 for effecting communications between the maintenance device 106 and other networked computing devices 12 via the communications link 20, including effecting communications with other maintenance devices 106, and other Internet-connected devices (not shown) via the Internet 22. Communications effected by the communications module 108 may be wired or wireless communications using any suitable communications networking technology and may be via the Internet 22 or any other communications other network.

The maintenance device 106 in the second embodiment includes a logger 110 for receiving status indications such as system 10 logs from networked computing devices 12.

The maintenance device 106 also includes a performance monitor 112 operable to determine performance metrics associated with one or more networked computing devices 12. Such performance metrics may include processing speed associated with the CPU 14 of a given networked computing device 12, CPU 14 usage, accuracy of CPU 14 processing and/or network communications (e.g. bit-error rate or the like), processing throughput, responsiveness, availability, other computing and/or networking performance metrics, or any combination thereof for example.

Furthermore, the maintenance device 106 includes a status collator 114 for collating status indications, which typically consist of the system 10 logs received from the logger 110 and the performance metrics received from the performance monitor 112. The status collator 114 is operable to associate one or more received status indications with a status type, thereby clustering multiple status indications related to a single issue or system 10 error, for example, into one or more clusters of status indications. Clustering status indications by the status collator 114 advantageously minimizes separate and possibly redundant processing of unclustered status indications that happen to be related to a single system 10 incident or event. In some embodiments, all status indications and any associated status types are stored in maintenance device 106 memory for later retrieval. However, in some embodiments, redundant status indications having the same status type are replaced by a single representative status indication and its status type, such that the status collator 114 filters at least some of the status indications.

The status collator 114 need not assign a status type to every status indication, and some status indications may not form part of a cluster of status indications. For example, the performance monitor 112 is operable to obtain performance metrics on a routine basis absence any association with a status type. Additionally or alternatively, the performance monitor 112 in some embodiments is operable to obtain performance metrics in the context of resolving particular error conditions or otherwise in association with a previously identified status type.

Control of status indications is passed from the status collator 114 to the main controller 116, which typically includes a CPU 14 (not shown therewithin in FIG. 9) and memory unit 16 (not shown therewithin in FIG. 9) operable to store instruction codes for directing operations of the CPU 14 of the maintenance device 106.

The controller 116 is operable to control a database controller 118, which in turn is operable to control a known-action database 120 containing known-action data. In the second embodiment, such known-action data is previously established, or otherwise known, to be effective as a maintenance action in response to associated status indications and/or status types. For example, a status indication of an error condition may be caused by a software bug having a known bug fix stored in the known-action database. Thus, if the error condition is indicated by the associated status indication received from a given network computing device 12, the bug fix can be retrieved from the known-action database 120 for use at the given networked computing device 12.

The controller 116 is also operable to control the communications module 108 directly to effect queries to other maintenance devices 106 of the plurality of networked computing devices 12.

The controller 116 is also operable to control a web searcher module 122, which in turn is operable to employ the communications module 108 to conduct automated web searching, such as using an available search application programming interface (API), using an available question-and-answer API, using an available data-dump process and then searching the resulting data dump(s), and/or by online web scraping.

The controller 116 is operable to control an emulator controller 124, which in turn is operable to control an emulator 126 to emulate selected operations of the plurality of networked computing devices 12. For example, if a computer process executed by a networked computing device 12 results in status indication(s) indicating an error condition, the maintenance device 106 is operable to use the emulator controller 124 and the emulator 126 to emulate the computer process and emulate proposed solutions, for example.

The controller 116 is operable to control a controller agent 128, which in is operable to control the communications module 108, such as to effect maintenance actions at selected networked computing devices 12.

Maintenance Method

Figure 10:
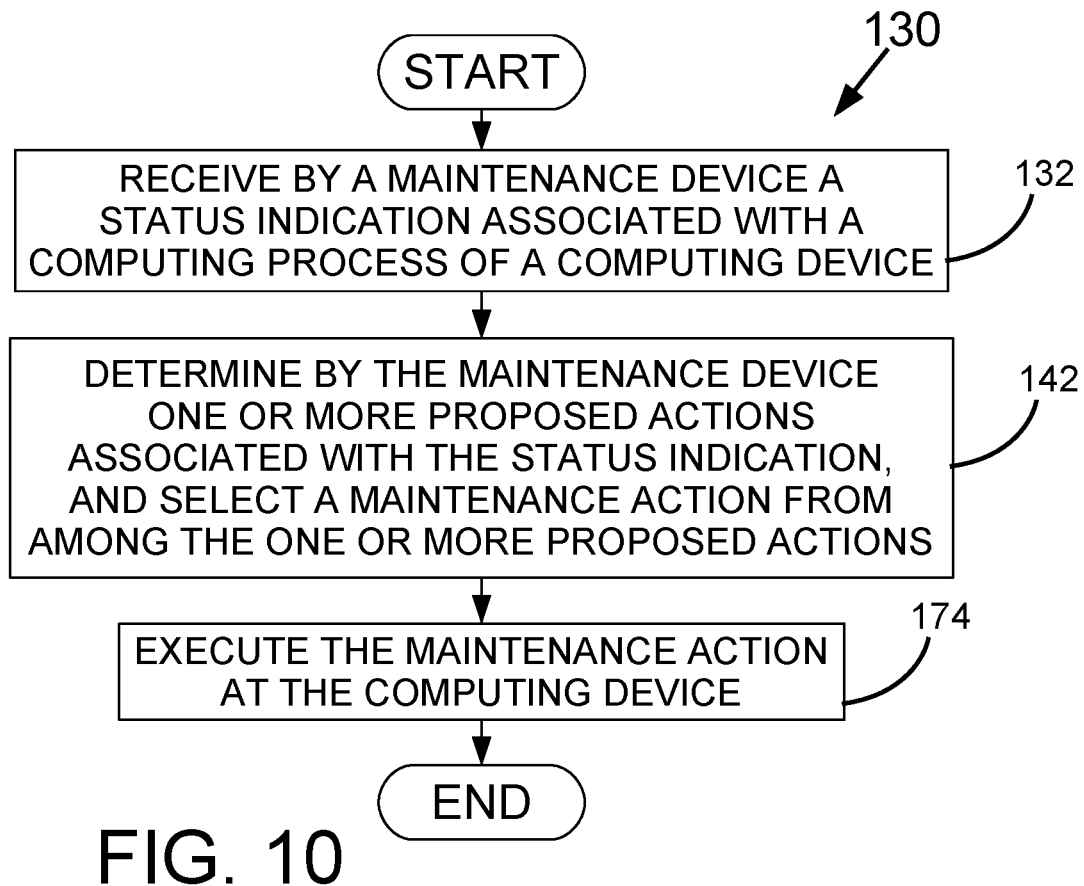
FIG. 10 is a flow diagram of a method of maintaining the computing process by the system shown in FIG. 9, showing the step of executing a maintenance action at the computing device.

Referring to FIG. 10, when electrical power is being supplied to a given maintenance device 106, its CPU 14 (not shown in FIG. 9) is directed to perform the steps of a method shown generally at 130. References herein to the maintenance device 106 executing, or being directed to execute, steps of a method or other blocks of code are references to its CPU 14 executing, or being directed to execute, such steps or blocks. The method 130 begins by the maintenance device 106 executing the instructions of block 132 shown in FIG. 10.

Block 132 directs the maintenance device 106 to receive a status indication associated with a computing process of a given networked computing device 12. In the second embodiment, receiving the status indication involves receiving the status indication via its communications module 108. Such status indication may be a system 10 log received from the given networked computing device 12 indicating a log status associated with the computing process. Alternatively, the status indication may be a response to a query previously transmitted from the performance monitor, where such response indicates a performance metric associated with the computing process, the networked computing device 12, the communications link 20, or any combination thereof for example. Such performance metric query may be issued by the maintenance device 106 in the context of resolving a previously identified error condition or other status type, for example.

The system 10 logs preferably include all logs of the system 10, which in variations of embodiments may include a variety of different types of logs such as application logs, docker logs, stack logs, system logs, and other types of logs of the system 10.

Figure 11:
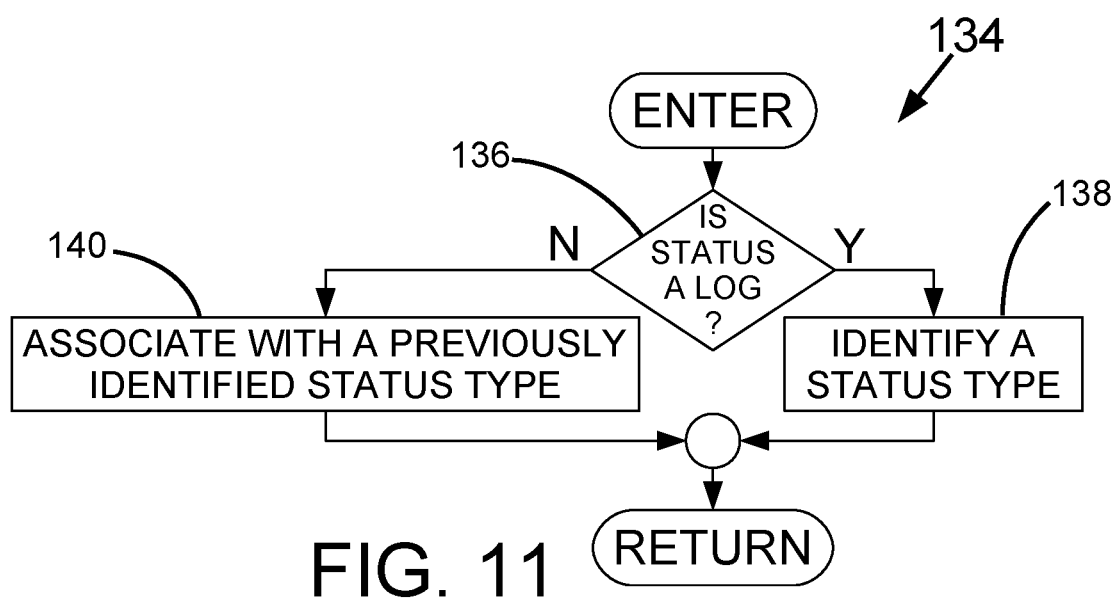
FIG. 11 is a flow diagram of a method of performing the step of receiving a status indication associated with the computing process according to the method shown in FIG. 10, showing the step of identifying a status type.

Referring to FIG. 11, an exemplary method for directing the maintenance device 106 to perform steps of block 132 (FIG. 10) is shown generally at 134. Method 134 begins execution at block 136, which directs the maintenance device 106 to determine whether the received communication of status indication is a system 10 log or a response to a query from the performance monitor 112.

If the received communication is a system 10 log, then the maintenance device 106 is directed by block 138 to pass the status indication to the logger 110 and the status collator 114 for identifying and associating a status type with the status indication.

If the received communication is a performance metric or other response to a query from the performance monitor 112, then the maintenance device 106 is directed by block 140 to pass the status indication to the performance monitor 112 and the status collator 114 for associating with a previously identified status type, if any.

In variations of embodiments, receiving a status indication can also involve storing the status indication and/or storing its associated status type, if any.

After either block 138 or block 140 has been executed, the process is directed to return to block 132 of FIG. 10.

Referring to FIG. 10, after block 132 has been executed, block 142 directs the maintenance device 106 to determine one or more proposed actions associated with the status indication. In variations, proposed action(s) may be determined in association with the status indication, its associated status type, or both the status indication and its associated status type.

Figure 12:
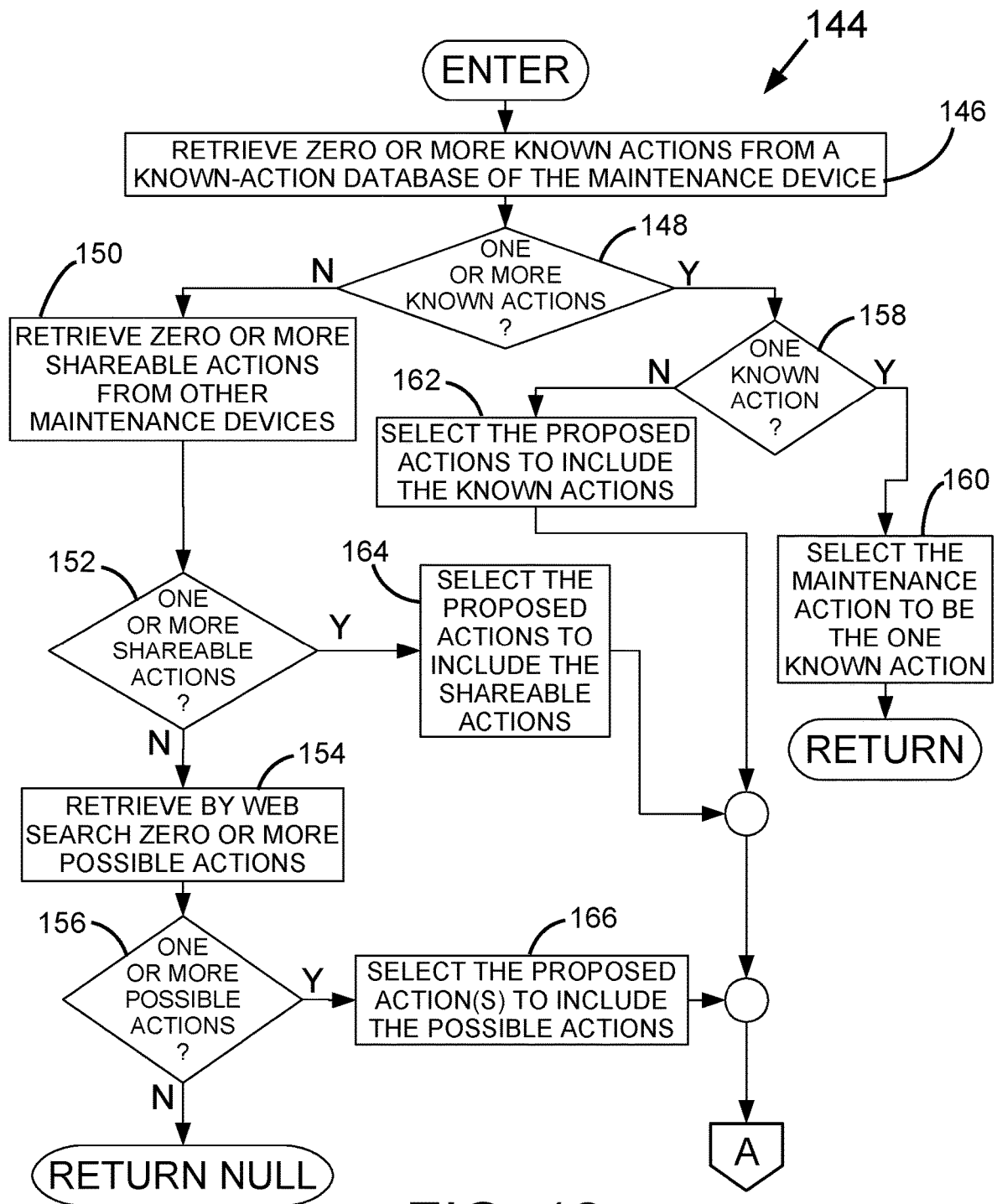
FIG. 12 is a flow diagram of a first portion of a method of performing the step of determining proposed action(s) associated with the status indication shown in FIG. 10, showing the steps of retrieving known actions, shareable actions, and possible actions, respectively.
Figure 13:
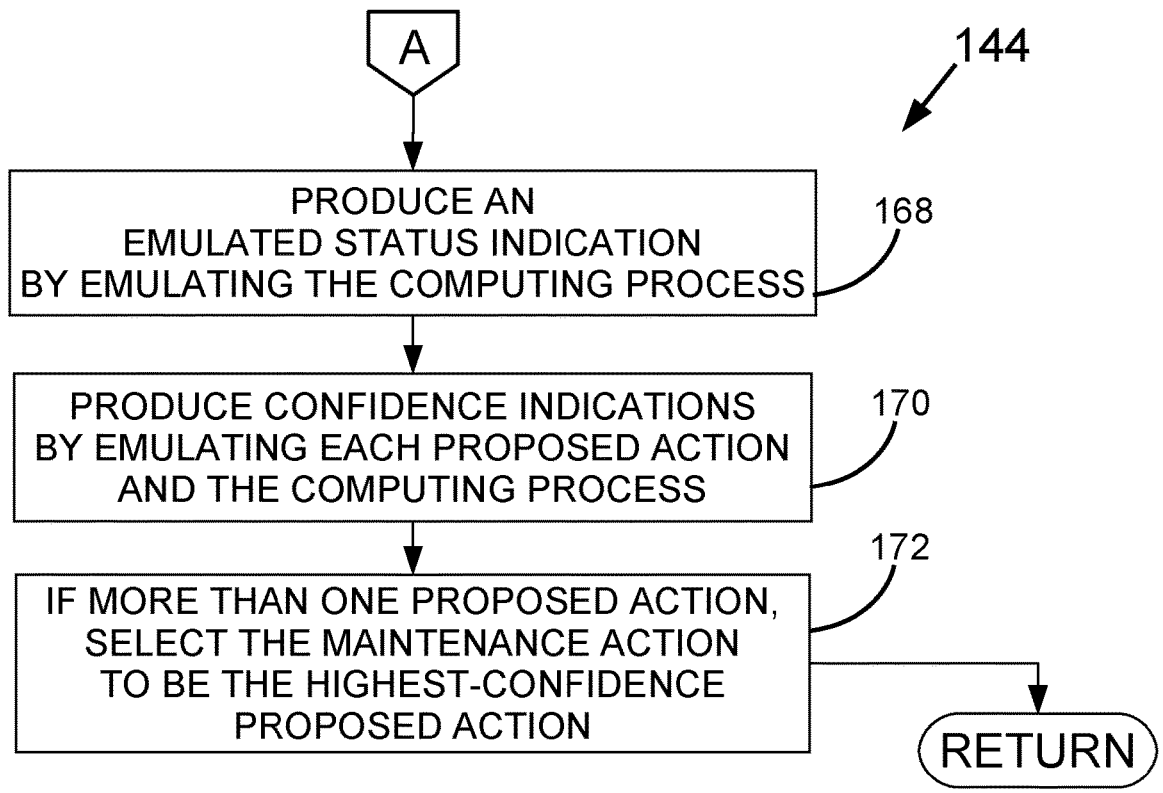
FIG. 13 is a flow diagram of a second portion of the method of performing the step of determining proposed action(s) associated with the status indication shown in FIG. 10, showing the step of selecting the maintenance action to be the highest-confidence proposed action.

Referring to FIGS. 12 and 13, an exemplary method for directing the maintenance device 106 to perform steps of block 142 (FIG. 10) is shown generally at 144. Method 144 begins execution at block 146, which directs the maintenance device 106 to retrieve zero or more known actions from a known-action database 120 of the maintenance device 106. In the second embodiment, retrieving known action(s) from the known-action database 120 involves retrieving known action(s) corresponding to the status indication received by block 132 (FIG. 10). In variations, the known action(s) may correspond to the status indication and/or its status type, if any.

After block 146 has been executed, block 148 directs the maintenance device 106 to determine whether one or more known actions were retrieved from the known-action database 120.

If no known actions were retrieved from the known-action database 120, then block 150 directs the given maintenance device 106 to retrieve shareable actions from other maintenance devices 106, if any. In the second embodiment, executing block 150 involves querying the respective databases of a number of other maintenance devices 106 to retrieve any shareable actions associated with the status indication. The respective databases may include the respective known-action databases of other maintenance devices 106, for example. In some embodiments, each different maintenance device 106 is associated with a different data centre comprising a subset of the plurality of networked computing devices 12, for example. Such different data centres may be geographically distant from each other and distributed around the world, for example. In some embodiments, some or all of the contents of the respective databases of the maintenance devices 106 may be designated as shareable to other maintenance devices 106 of the plurality of networked computing devices 12 but not shareable to other computers more generally. Additionally or alternatively, some or all of the contents of the respective databases of the maintenance devices may be designated as shareable to the public without restriction, such as via the Internet 22 for example.

After block 150 has been executed, block 152 directs the maintenance device 106 to determine whether one or more shareable actions were obtained as a result of the querying by block 150. That is, whether any shareable actions were obtained at all.

If by block 152 it is determined that no shareable actions were obtained, then the maintenance device 106 is directed by block 154 to conduct a web search and retrieve by the web search zero or more possible actions corresponding to the status indication. Executing block 154 in the second embodiment involves causing the web searcher 122 (FIG. 9) to create one or more web queries in response to the status indication and/or its status type, and to cause the web searcher 122 to search web pages via the Internet 22 using the communications module 108 in search of online search results associated with the status indication and/or its status type. By way of particular example, online searching can be performed to produce possible solutions or other ameliorative maintenance actions that can be taken in response to an error condition indicated by the status indication and/or its status type. Such possible solutions, if any are found by the web searching, are typically retrieved via the Internet 22.

Various techniques may be employed to conduct the web searching of block 154. For example, some websites have associated therewith a search application programming interface (API) for searching the website. Additionally, some websites have associated therewith a question-and-answer API for providing answers to queries presented to the question-and-answer API. Some websites have a search API or question-and-answer API that imposes a usage limit, but also provides a downloadable data-dump process. In such circumstances, a combination of downloading and storing data dump(s), limited use of the API, and searching of the downloaded data accomplishes the desired web searching. Some websites permit web scraping, in which case the website is scraped to produce searchable web content or, alternatively, the website is searched and then the web content forming the search results is scraped from the website.

In some embodiments, web search results are processed using natural language processing (NLP) to produce the zero or more possible actions corresponding to the status indication. While FIG. 12 shows the execution of block 150 as occurring prior to the execution of block 154, in some embodiments it is reversed such that a given maintenance device 106 will conduct a web search via the Internet 22 prior to querying other maintenance devices 106. In some embodiments, the given maintenance device 106 initiates a low-priority web search, then immediately initiates queries within the network of maintenance devices 106 prior to evaluating web search results. Other timeline variations are possible.

According to the exemplary embodiment shown in FIG. 12, after block 154 has been executed then block 156 directs the maintenance device 106 to determine whether one or more possible actions were obtained as a result of the web searching by block 154. That is, whether any possible actions were obtained at all.

If by block 156 it is determined that no possible actions were obtained, then the process returns a null response indicating that no proposed actions (i.e. no known actions, no shareable actions, and no possible actions) were obtained. In such circumstances, an alert to a human technician may be initiated for further human-based analysis.

Still referring to FIG. 12, if by block 148 it is determined that one or more known actions were retrieved from the known-action database 120 of the given maintenance device 106, then block 158 directs the given maintenance device 106 to determine whether exactly one known action was retrieved.

If by block 158 it is determined that one known action was retrieved, then block 160 directs the maintenance device 106 to select the maintenance action to be the one retrieved known action.

After block 160 has been executed, the process returns to the method 130 at block 142 (FIG. 10).

Referring back to FIG. 12, if by block 158 it is determined that one known action was not retrieved, that is, that a plurality of known actions were retrieved, then block 162 directs the maintenance device 160 to select the proposed actions to include the plurality of retrieved known actions. The known actions retrieved from the known-action database 120 are assigned to be a plurality of proposed actions by selecting the proposed actions to include such known actions.

After block 162 has been executed, further processing occurs as shown in FIG. 13 and as described herein below.

Still referring to FIG. 12, if by block 152 it is determined that one or more shareable actions were retrieved then block 164 directs the maintenance device 106 to select the proposed actions to include the one or more shareable actions.

After block 164 has been executed, further processing as described below with reference to FIG. 13 occurs.

If by block 156 it is determined that one or more possible actions were retrieved, then block 166 directs the maintenance device 106 to select the proposed actions to include the one or more possible actions.

Referring to FIG. 13, after block 162, 164, or 166 (FIG. 12) has been executed, block 168 of FIG. 13 directs the maintenance device 106 to produce an emulated status indication by emulating the computer process. In the second embodiment, the system 10 is operable to create an emulation environment, which may be a quarantined virtual machine for example, for reconstructing the computer process executed by the particular networked computing device(s) 12 that led to a given error condition or other status indication. Emulating the computer process may involve emulating logged activities, including logged input and output streams, of the networked computing device(s) 12. Emulating the computer process may involve determining performance metrics of the networked computing device(s) 12 so as to more accurately emulate the computer process, for example. Emulating the computer process typically involves determining whether the emulated status indication(s) produced by the emulated computer process are identical or analogous to the status indication originally generated by the computer process itself. Emulating the computer process to produce matching emulated status indication(s) may involve multiple iterations of emulations employing different parameters and/or different process steps, for example. Emulations of the computer process may be iteratively optimized toward matching the emulated status indication to the originally generated status indication, for example. Upon optimization of the emulated status indication, in some embodiments the maintenance device 106 is directed to return to block 146 (FIG. 12) to newly search proposed action(s) in response to an optimized formulation of the status type associated with the status indication.

After block 168 has been executed, block 170 directs the maintenance device 106 to emulate each proposed action and the computing process to produce a confidence indication associated with each proposed action. In the second embodiment, if emulating the computer process alone produces an emulated status indication that matches or otherwise corresponds to the status indication, but emulating a given proposed action followed by emulating the computer process fails to produce a matching emulated status indication and does not produce new error conditions indicated by other emulated status indications, then such proposed action is assigned a high confidence indication. On the other hand, if emulating the given proposed action followed by emulating the computer process produces an emulated status indication that matches or otherwise corresponds to the originally generated status indication, then that proposed action is assigned a low confidence indication. Various techniques for computing each confidence indication may be employed, for example.

After block 170 has been executed, block 172 directs the maintenance device 106 to select, if more than one proposed action was emulated, the maintenance action to be the highest-confidence action among the emulated proposed actions. In some embodiments, a maintenance action will not be selected if none of the emulated proposed actions result in a sufficiently high confidence indication. In some embodiments, a human-based review of the proposed actions and their associated confidence indications is permitted, but need not be required.

While FIGS. 12 and 13 show that the proposed actions are either the known actions, the one or more shareable actions, or the one or more possible actions, in general any combination of different types of proposed actions may be employed when determining the confidence indications. For example, blocks 146, 150, and 154 (FIG. 12) may be executed such that the proposed action(s) include any known actions, any shareable actions, and any possible actions that are obtained. In some embodiments, blocks 168 and 170 (FIG. 13) are executed even if block 160 (FIG. 12) is executed, such that a single known action retrieved from the known-action database 120 will be subjected to emulation testing. In some embodiments, if the confidence indication(s) resulting from emulation testing of known action(s) are not sufficiently high, then blocks 150 and/or 154 are executed to obtain further proposed actions for emulation testing. Other arrangements of obtaining and emulation testing proposed actions may be employed. In general, upon executing blocks 146 to 166 the proposed action(s) can include any number of known actions, possible actions, and/or shareable actions.

After block 172 has been executed such that a maintenance action is selected, the process returns to the method 130 at block 142 (FIG. 10).

Referring to FIG. 10, after block 142 has been executed, block 174 in the second embodiment directs the process to execute the maintenance action at the networked computing device 12. In general, executing the maintenance action may involve multiple processing steps possibly involving more than one networked computing device 12 for example. In the second embodiment, the controller 116 (FIG. 9) is operable to notify the controller agent 128 of the selected maintenance action, and the controller agent 128 is operable to communicate via the communications module 108 with the networked computer device 12 to cause the maintenance action to be executed at the networked computing device 12.

Figure 14:
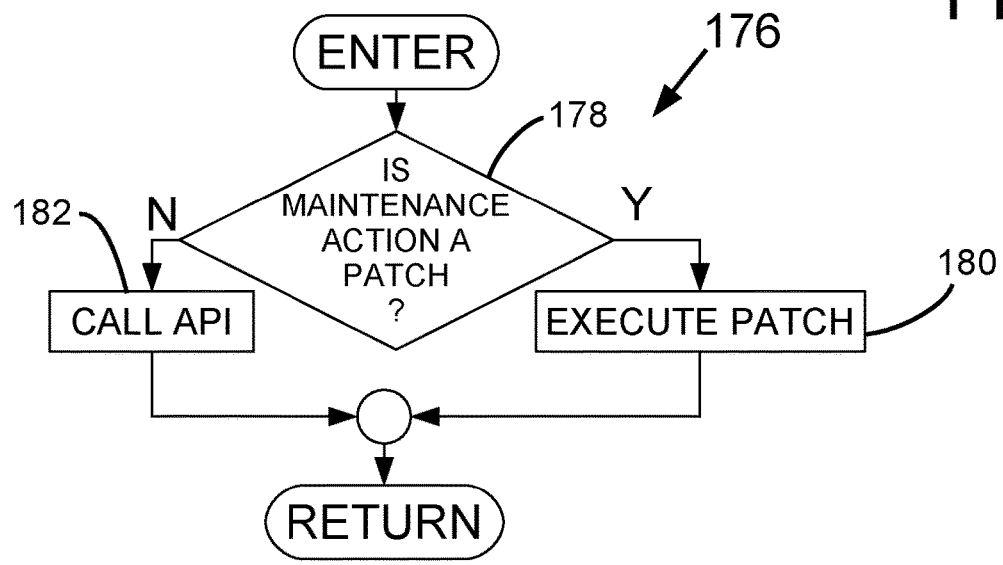
FIG. 14 is a flow diagram of a method of performing the step of executing the maintenance action at the computing device shown in FIG. 10, showing the steps of executing a patch and calling an application program interface.

Referring to FIG. 14, an exemplary method for directing the plurality of networked computing devices 12 to perform steps of block 174 (FIG. 10) is shown generally at 176. Method 176 begins execution at block 178, which directs the maintenance device 106 to determine whether the maintenance action is a patch-type program change (i.e. a set of changes to a computer program or its supporting data designed to update, fix or improve it).

If by block 178 it is determined that the maintenance action is a patch, then block 180 directs the maintenance device 106 to modify the computer process by causing the networked computing device 12 to execute the patch-type program change. In the second embodiment, the controller agent 128 (FIG. 9) communicates the patch, or communicates instructions for accessing the patch, to the networked computing device 12 along with a remote command to execute the patch at the networked computing device 12.

If by block 178 it is determined that the maintenance action is not a patch, then block 182 directs the maintenance device 106 to modify the computing process by use of an application programming interface (API). Calling the API may require authorization as may be secured by various means of trust between the networked computing devices 12 including the maintenance device 106.

Other techniques for modifying the computing process in response to the selected maintenance action(s) may be employed.

After block 180 or 182 has been executed, the process is directed to return to the method 130 at block 174 (FIG. 10).

Referring back to FIG. 10, after block 174 has been executed, the method 130 ends. In general, the process of maintaining computer processes is ongoing for as long as electrical power is being supplied to the relevant devices.

Thus, there is provided a method of maintaining a computing process executable by a computing device of a plurality of networked computing devices, the method comprising: (e) receiving, from the computing device by a maintenance device of the plurality of networked computing devices, a status indication associated with the computing process; (f) determining by said maintenance device one or more proposed actions associated with said status indication; (g) selecting by said maintenance device a maintenance action from among said one or more proposed actions; and (h) executing said maintenance action at the computing device.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A method of maintaining a computing process executable by a computing device of a plurality of networked computing devices, the method comprising:
   (a) receiving, from the computing device by a maintenance device of the plurality of networked computing devices, a status indication associated with the computing process;
   (b) determining by said maintenance device one or more proposed actions associated with said status indication;
   (c) selecting by said maintenance device a maintenance action from among said one or more proposed actions; and
   (d) executing said maintenance action at the computing device;
   wherein step (c) comprises emulating each said proposed action and said computing process to produce a confidence indication associated with said each proposed action, and selecting said maintenance action to be a highest-confidence action of said proposed actions.

2. The method of claim 1 wherein step (a) comprises receiving said status indication selected from the group consisting of a system log and a performance metric.

3. The method of claim 2 wherein step (a) comprises associating said status indication with a status type.

4. The method of claim 1 wherein step (b) comprises retrieving, by said maintenance device from a known-action database of said maintenance device, zero or more known actions corresponding to said status indication, and selecting said one or more proposed actions to include said zero or more known actions.

5. The method of claim 4 wherein step (b) further comprises querying, by said maintenance device, respective databases of a plurality of said maintenance devices to retrieve zero or more shareable actions associated with said status indication, and selecting said one or more proposed actions to include said zero or more shareable actions.

6. The method of claim 5 wherein step (b) further comprises conducting by said maintenance device a web search to produce zero or more possible actions associated with said status indication, and selecting said one or more proposed actions to include said zero or more possible actions.

7. The method of claim 4 wherein step (c) comprises, if said one or more proposed actions consist of one said known action, selecting said maintenance action to be said one known action.

8. The method of claim 4 wherein step (c) comprises emulating, by said maintenance device, said computing process to produce an emulated status indication.

9. The method of claim 1 wherein step (d) comprises modifying said computing process by executing a patch-type program change at said computing device.

10. The method of claim 1 wherein step (d) comprises modifying said computing process by use of an application program interface.

* * * * *